US009503768B2

United States Patent
Gray et al.

(10) Patent No.: US 9,503,768 B2
(45) Date of Patent: *Nov. 22, 2016

(54) SYSTEM AND METHOD FOR CONTENT TRANSMISSION NETWORK SELECTION

(71) Applicant: AT&T INTELLECTUAL PROPERTY I, LP, Atlanta, GA (US)

(72) Inventors: James H Gray, Atlanta, GA (US); Robert A. Koch, Norcross, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/959,566

(22) Filed: Dec. 4, 2015

(65) Prior Publication Data

US 2016/0198209 A1 Jul. 7, 2016

Related U.S. Application Data

(63) Continuation of application No. 14/280,729, filed on May 19, 2014, now Pat. No. 9,232,272, which is a continuation of application No. 11/215,417, filed on Aug. 30, 2005, now Pat. No. 8,769,595, which is a continuation-in-part of application No. 10/028,153, filed on Dec. 20, 2001, now abandoned.

(51) Int. Cl.

| | |
|---|---|
| *H04N 7/173* | (2011.01) |
| *H04N 21/266* | (2011.01) |
| *H04N 21/2665* | (2011.01) |
| *H04N 21/6587* | (2011.01) |
| *H04N 21/61* | (2011.01) |

(Continued)

(52) U.S. Cl.
CPC ...... *H04N 21/2665* (2013.01); *H04N 7/17318* (2013.01); *H04N 21/2347* (2013.01); *H04N 21/2381* (2013.01); *H04N 21/25883* (2013.01); *H04N 21/266* (2013.01); *H04N 21/26208* (2013.01); *H04N 21/4622* (2013.01); *H04N 21/47202* (2013.01); *H04N 21/6125* (2013.01); *H04N 21/64322* (2013.01); *H04N 21/6587* (2013.01)

(58) Field of Classification Search
CPC ............... H04N 7/17318; H04N 21/2347; H04N 21/25883; H04N 21/26208; H04N 21/266

See application file for complete search history.

(56) References Cited

U.S. PATENT DOCUMENTS

| | | |
|---|---|---|
| 5,555,441 A | 9/1996 | Haddad |
| 5,608,446 A | 3/1997 | Carr |

(Continued)

FOREIGN PATENT DOCUMENTS

| | | |
|---|---|---|
| WO | 99/60790 | 11/1999 |

OTHER PUBLICATIONS

Randell, "Hardware/Software Tradeoffs: A General Design Principle", p. 19-21, Jan. 25, 1985.

*Primary Examiner* — Benjamin R Bruckart
*Assistant Examiner* — Jason Thomas
(74) *Attorney, Agent, or Firm* — Guntin & Gust, PLC; Atanu Das

(57) ABSTRACT

A content transmission selection system is disclosed. The content transmission selection system receives requests from viewers for specific video content items. Using characteristics of the designated content item, the content transmission selection system determines whether to transmit the content item over a broadcast network or a broadband network.

20 Claims, 6 Drawing Sheets

(51) Int. Cl.
*H04N 21/462* (2011.01)
*H04N 21/472* (2011.01)
*H04N 21/2347* (2011.01)
*H04N 21/258* (2011.01)
*H04N 21/262* (2011.01)
*H04N 21/2381* (2011.01)
*H04N 21/643* (2011.01)

(56) References Cited

U.S. PATENT DOCUMENTS

| | | |
|---|---|---|
| 5,659,539 A | 8/1997 | Porter |
| 5,699,107 A | 12/1997 | Lawler |
| 5,761,602 A | 6/1998 | Wagner |
| 5,790,935 A | 8/1998 | Payton |
| 5,852,721 A | 12/1998 | Dillon |
| 5,914,712 A | 6/1999 | Sartain |
| 6,016,307 A | 1/2000 | Kaplan |
| 6,052,715 A | 4/2000 | Fukui |
| 6,092,113 A | 7/2000 | Maeshima |
| 6,104,720 A | 8/2000 | Kisor |
| 6,118,472 A | 9/2000 | Dureau |
| 6,195,692 B1 | 2/2001 | Hsu |
| 6,426,959 B1 | 7/2002 | Jacobson |
| 6,438,110 B1 | 8/2002 | Rai |
| 6,510,556 B1 | 1/2003 | Kusaba et al. |
| 6,560,221 B1 | 5/2003 | Hara |
| 6,631,413 B1 | 10/2003 | Aggarwal |
| 6,674,994 B1 | 1/2004 | Fell |
| 6,718,374 B1 | 4/2004 | Del Sordo |
| 6,766,526 B1 | 7/2004 | Ellis |
| 6,868,452 B1 | 3/2005 | Eager |
| 6,885,675 B1 | 4/2005 | Gibbings |
| 6,889,385 B1 | 5/2005 | Rakib |
| 6,961,430 B1 | 11/2005 | Gaske |
| 6,971,119 B1 | 11/2005 | Arsenault |
| 6,986,156 B1 | 1/2006 | Rodriguez |
| 7,089,577 B1 | 8/2006 | Rakib |
| 7,284,261 B1 | 10/2007 | Connelly |
| 7,305,357 B2 | 12/2007 | Hamilton |
| 7,564,873 B1 | 7/2009 | Zack |
| 7,761,572 B1 | 7/2010 | Auerbach |
| 2002/0010920 A1 | 1/2002 | Bertram |
| 2002/0026645 A1 | 2/2002 | Son |
| 2002/0087661 A1 | 7/2002 | Matichuk |
| 2002/0087694 A1 | 7/2002 | Daoud |
| 2003/0061619 A1 | 3/2003 | Giammaressi |
| 2003/0163824 A1 | 8/2003 | Gordon |
| 2008/0101460 A1 | 5/2008 | Rodriguez |

SYSTEM AND METHOD FOR CONTENT TRANSMISSION NETWORK SELECTION

CROSS-REFERENCE TO RELATED APPLICATIONS

This application is a Continuation of and claims priority to U.S. patent application Ser. No. 14/280,729, filed May 19, 2014, (now U.S. Pat. No. 9,232,272), which is a Continuation of and claims priority to U.S. patent application Ser. No. 11/215,417, filed Aug. 30, 2005 (now U.S. Pat. No. 8,769,595), which is a continuation-in-part of U.S. patent application Ser. No. 10/028,153. The contents of each of the foregoing is/are hereby incorporated by reference into this application as if set forth herein in full.

FIELD OF THE DISCLOSURE

The present invention relates to systems and methods for content transmission. More specifically, the invention relates to systems and methods for determining whether to transmit content using a broadcast network or a broadband network.

Description of the Prior Art

The demand for the quick and easy access to a wide variety of content which may be, for example, video, data, etc., has led to the rapid growth of numerous transmission systems. For example, direct to home (DTH) satellite systems and cable systems have been deployed to compete with traditional broadcast networks. Similarly, broadband data networks, such as for example, digital subscriber line (DSL) networks and cable modem data networks have been deployed to provide high speed point-to-point data communication. Generally, the broadcast-type networks are very efficient at transmitting data items, particularly video, to a large number of viewers, but lack the capability to target specific viewers. Broadband data networks, by comparison, are very good at transmitting content to small numbers of discrete viewers and are not as efficient at simultaneously reaching large numbers of viewers.

Thus, there are numerous content transmission systems now available that did not exist even a few years ago. Applicants have noted, however, that systems and methods have not been implemented for integrating the selective use of these different systems to leverage their respective strengths. More specifically, existing systems and methods lack the capability to select the single network from a plurality of transmission networks that can most efficiently transfer a content item at a given time. Such a system or method would enable operators of transmission networks to best utilize network resources, thereby lowering costs of operation and lowering prices for consumers.

BACKGROUND OF THE DISCLOSURE

Accordingly, systems and methods for content transmission are disclosed. In systems in accordance with an illustrative embodiment of the invention, viewers enter requests for content items such as, for example, videos, at their set top box. Requests contain information such as the geographic location to which the content is to be transmitted, the time at which the viewer desires to view the content, and a price the viewer is willing to pay for the content.

The requests are transmitted over a broadband network, a back channel to a broadcast network, or both to a transmission network selector. The transmission network selector determines whether the content will be transmitted over a broadcast network or a broadband network. This determination is based on the information provided with the transmission request, information about the content itself, and information about the broadcast and broadband networks. Information about the content may comprise, for example, the duration of the content and the required bandwidth for transmission of the content. Information about the broadcast and broadband networks may comprise, for example, the available bandwidth on the networks, the geographic boundaries of the networks, and the cost of transmission at a given time of day on the networks.

Once a transmission network has been selected, the transmission network selector forwards a transmission notification to the viewer indicating the time the requested item will be transmitted and the transmission network over which it will be transmitted. Thereafter, the content is transmitted to the viewer.

BRIEF DESCRIPTION OF THE DRAWINGS

The present invention will be better understood after reading the following detailed description of an illustrative example thereof with reference to the appended drawings, in which.

DETAILED DESCRIPTION OF THE DRAWINGS

Figure 1:
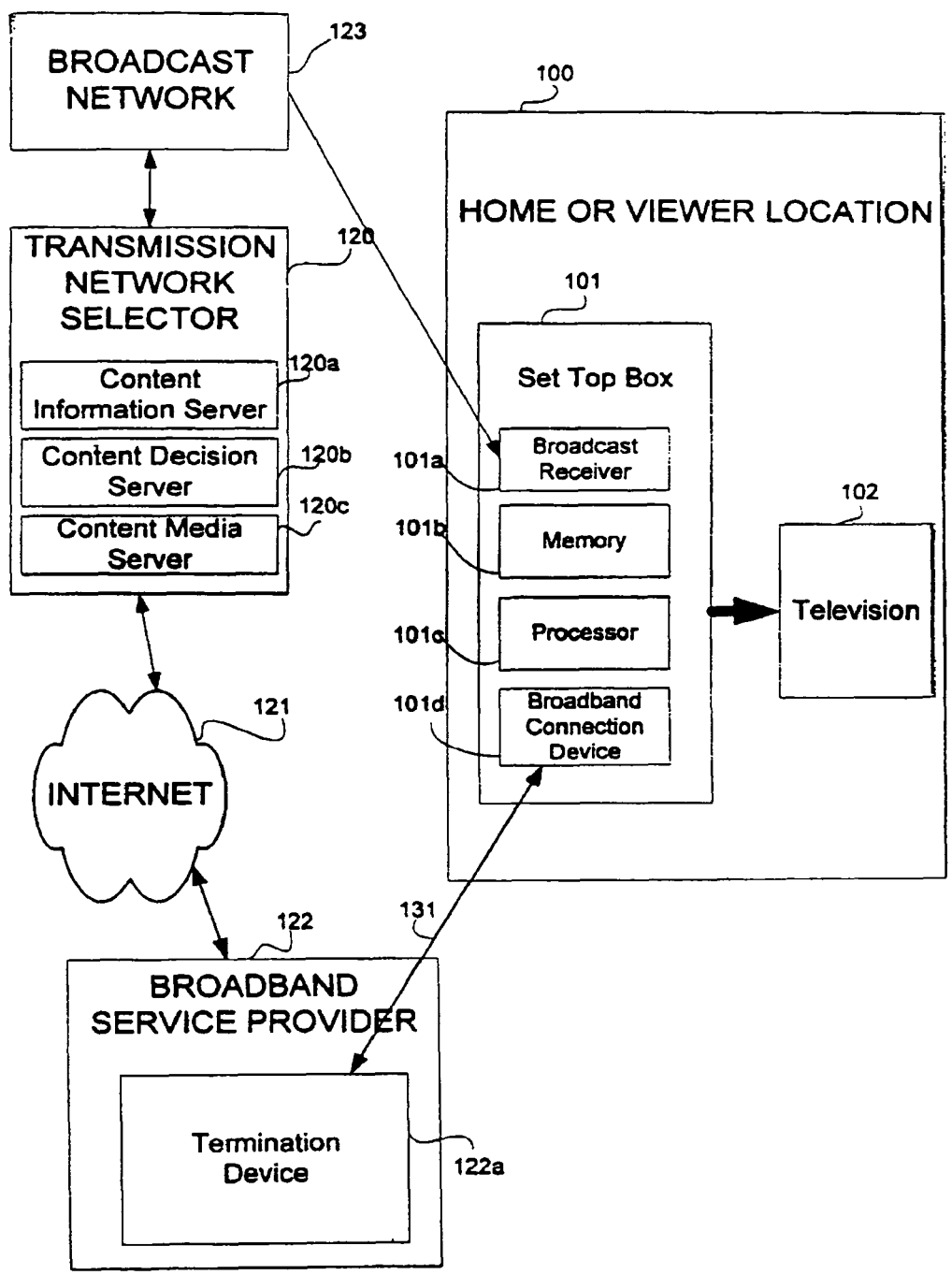
FIG. 1 is a block diagram of a system for network transmission selection in accordance with an aspect of the invention.

An illustrative example of a system which meets the above-mentioned objects and provides other beneficial features will be described below with reference to FIGS. 1-6. Those skilled in the art will readily appreciate that the description given herein with respect to those figures is for explanatory purposes only and is not intended in any way to limit the scope of the invention. Throughout the description, like reference numerals will refer to like elements in the respective figures.

FIG. 1 is a diagram of a system incorporating an illustrative transmission network selection system in accordance with an aspect of the invention. At viewer location 100, viewers receive an identification from broadcast content source 123 that content items such as, for example, movies are available to the viewer upon request. When a viewer selects to view an item, the selection is transmitted either via broadband service provider 122 and Internet 121 or via a back channel of broadcast network 123 to transmission network selector 120. Transmission network selector 120 automatically determines whether to transmit the requested content via broadcast network 123 or to download the content item over broadband source 122. Once the determination has been made, network selector 120 forwards the content item to the viewer location 100 via the selected network.

As shown in FIG. 1, home or viewer location 100 contains a viewer device 101 that provides a video input to television 102. Viewer device 101 can be a set top box, a personal computer, or any electronic device capable of receiving, storing, and processing video signals. Viewer device 101 comprises a broadcast receiver 101*a* for receiving video from a broadcast network such as, for example, a DTH satellite network, a terrestrial wireless network, or a cable television broadcast network. Memory 101*b* may be a hard disk drive (HDD) or any memory device that enables the viewer device to store previously transmitted content, information about the content, and information about the transmission of the content. Processor 101*c* enables the viewer device to perform operations such as displaying a list of available content items from which a viewer may make a transmission request. Broadband connection device 101*d* provides connectivity to broadband service provider 122 and may be, for example, a DSL modem or cable modem.

Broadband service provider 122 provides a broadband connection between viewer device 101 and transmission network selector 120. Broadband service provider 122 may be, for example, a DSL service provider, or the like. Generally, service provider 122 receives high-speed connections 131 from viewer device 101 and provides access to transmission network selector 120 usually via Internet 121. As shown, service provider 122 comprises a termination device 122*a* for receiving a communication connection from viewer device 100. Device 122*a* may be, for example, a DSL modem.

Broadcast network 123 may be, for example a DTH satellite provider. Broadcast content is transmitted from transmission network selector 120 to viewer device 101 over broadcast network 123. Viewer device 101 contains broadcast receiver 101*a* to receive broadcast content. Data is also transmitted from viewer device 101 to transmission network selector 120 over a back channel of broadcast network 123 such as, for example, a dial-up modem.

Transmission network selector 120 operates to determine whether to transmit video content to a viewer via a traditional broadcast network 123 or via broadband provider 122. Transmission network selector 120 comprises content information server 120*a*, content decision server 120*b*, and content media server 120*c*. Content information server 120*a* transmits to viewer device 101 a list of available content items from which the viewer can make a request. Content decision server 120*b* receives the viewer's request for a content item, selects a network over which to transmit the content, and forwards a transmission notification to viewer device 101. Finally, content media server 120*c* queues and transmits the content to the selected transmission network. If the content is to be transmitted over broadcast network 123, content media server 120*c* transmits content to broadcast content transmitter, which, in turn, transmits the content over broadcast network 123 to broadcast receiver 101*a* in viewer device 101. Alternatively, the content may be transmitted over broadband network 122 to viewer device 101.

Figure 2:
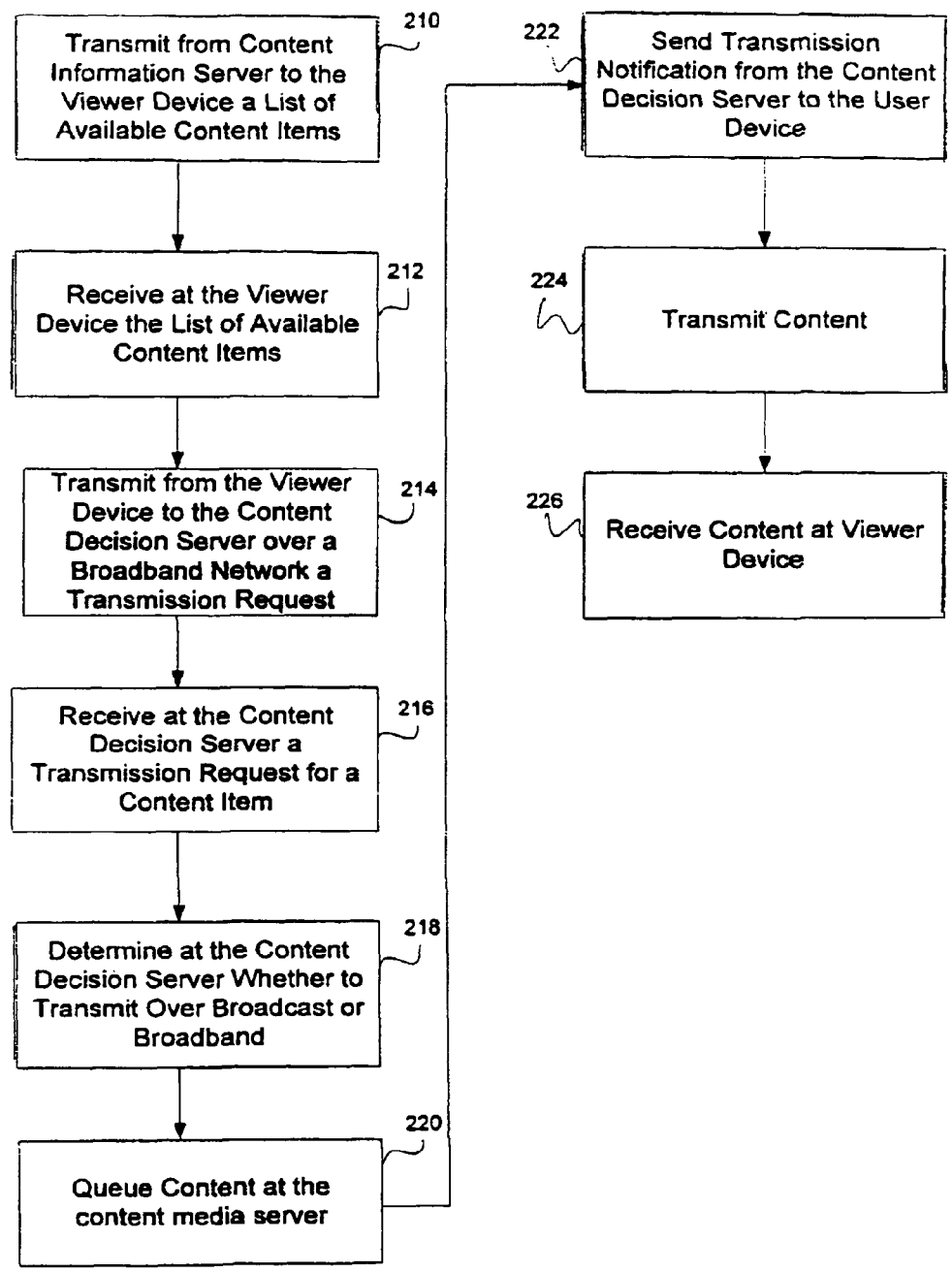
FIG. 2 is a flow chart of a method for network transmission selection in accordance with the present invention.

FIG. 2 illustrates a flow chart of a method for content transmission network selection in accordance with an aspect of the invention. At step 210 a list of available content items such as, for example, movies or television programs is transmitted from content information server 120*a* to viewer device 101. The list may be downloaded via broadcast content source 123 or broadband provider 122. At step 212, the list of available content items is received at the viewer device. The viewer may then review the list of movies and select the one(s) he or she desires to view. The viewer may also indicate when he or she desires to view the video, the price he or she is willing to pay for the video, the geographic location to which the video is to be sent, as well as other information about the transmission request. At step 214, a request for one of the videos is transmitted from viewer device 101 to content decision server 120 either via broadband network 122 or via a back channel of broadcast network 123. At step 216, the transmission request is received at content decision server 120.

At step 218, content decision server 120 automatically determines whether to transmit content using a broadcast network or a broadband network. This determination is based upon the characteristics of the transmission request, the characteristics of the content to be transmitted, the characteristics of the broadcast network, the characteristics of the broadband network, and the nature and volume of all other requests. The characteristics of the transmission request may include, for example, the geographic location to which the content is to be transmitted, the time at which the content is expected to be viewed, a dollar amount that the viewer is willing to pay for the content, or any other information about the transmission request that would be helpful in selecting a transmission network for the requested content. Characteristics of the content to be transmitted that may influence the network selection include, for example, the size and/or duration of the content, the required bandwidth for transmission of the content, features to be present with the content such as, for example, fast forward, rewind, and VCR controls, the number of requests for identical content from different viewers, or any other information about the content that would be helpful in selecting a transmission network for the requested content. Characteristics of the broadcast network that may influence the determination include, for example, the available bandwidth on the network, the geographic boundaries of the network, the cost of transmission at a given time of day on the network, or any other information about the broadcast network that would be helpful in selecting a transmission network for the requested content. The characteristics of the broadband network may include the scheduled or predicted available bandwidth on the network, the geographic boundaries of the network, the cost of transmission at a given time of day on the network, or any other information about the broadband network that would be helpful in selecting a transmission network for the requested content.

At step 220, content is queued at content media server 120*c*. Content media server 120*c* aggregates the content to be transmitted and formats the content for the selected transmission network. Formatting content for transmission over the selected network involves choosing a means to encapsulate the content for the selected network topology while addressing security as well as other factors. For example, a movie file stored in MPEG format may be packaged for DTH satellite broadcast by encapsulating the file in a DVB compliant spooler file which may then be routed through a transport multiplexor that applies real-time broadcast conditional access. Packaging for transmission over a broadband network such as a DSL network may include encapsulation into a TCP/IP packet stream which is encrypted and copy-protected and routed through a secure ATM switch fabric to the viewer device using secure sockets. Once the content has been formatted, content media server 120*c* transmits the resulting data stream to the appropriate transmission network. At step 222, a notification of the transmission characteristics of the content is transmitted from content decision server 120*b* to viewer device 101 over broadband network 122. Transmission characteristics of the content may include, for example, the time of transmission, the selected transmission network, network specific information such as the DTH transponder frequency and polarity, stream ID's and encryption/decryption codes, or any other information helpful or necessary for transmission. DTH transponder frequency and polarity is used to tune the DTH receiver to the correct transponder frequency. Stream ID's are used to identify which packets to extract in the selected MPEG multiplex stream. Decryption keys are used to decrypt data. Viewer device 101 utilizes the transmission characteristics to identify which of the connected networks to monitor for the content, how to isolate the specific content on the selected network, and how to process any security measures.

At step 224, the content is transmitted over broadcast network 123 or broadband network 122. Each content item may be sent directly to the viewer device, or, depending on the topology of the selected network, the content item may first be sent to a staging server. At step 226, viewer device 101 receives the content. If the content is being broadcast, viewer device 101 will tune to the appropriate broadcast channel or DTH transponder frequency. If the content is being transmitted over a broadband network, the viewer device will download the content through broadband connection device 101*d*.

Figure 3:
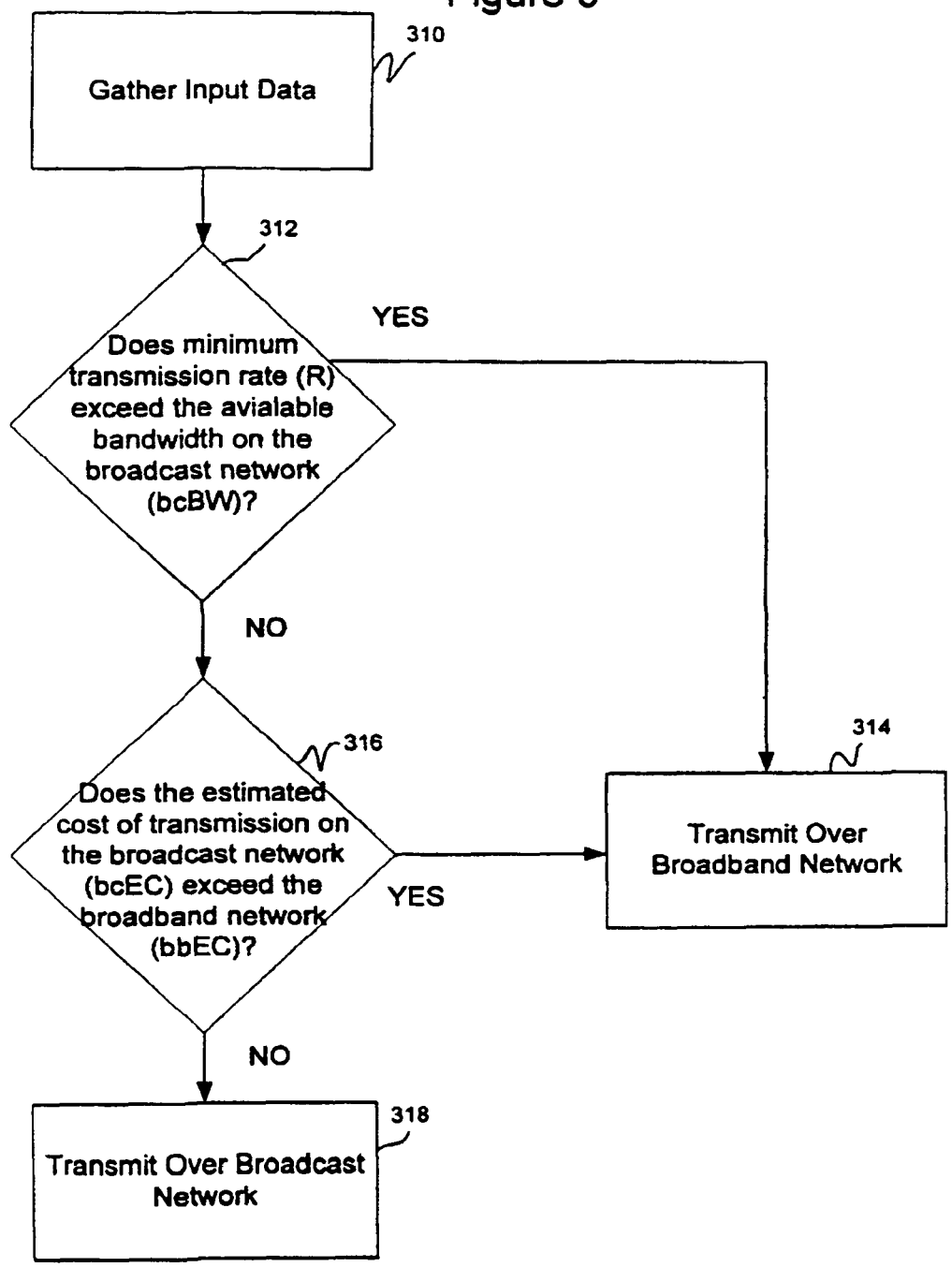
FIG. 3 is a flow chart of an illustrative example of the steps involved in the step of determining at the content decision server whether to transmit over a broadcast or a broadband network.

FIG. 3 is a flow chart of an illustrative example of a process for determining whether to transmit data over a broadcast or a broadband network. At step 310, content decision server 120*b* gathers input data comprising the characteristics of the transmission request, the characteristics of the content to be transmitted, and the characteristics of the broadcast network and broadband networks. For example, characteristics of the transmission request may include the time (T) that the content is requested to be viewed. Characteristics of the content to be transmitted may include the number of requests for the content (N), the size of the content in megabites (S), and the minimum transfer rate for the content (R). Characteristics of the broadband network may include the cost of transport per megabite on the broadband network (bbC) and the estimated cost of transport on the broadband network (bbEC). The estimated cost of transport on the broadband network is equal to the product of the size of the content in megabites and the cost of transport per megabite on the broadband network (bbEC=S*bbC). Finally, characteristics of the broadcast network may include the cost of transport per megabite on the broadcast network (bcC), the available bandwidth on the broadcast network (bcBW), and the estimated cost of transport on the broadcast network (bcEC). The estimated cost of transport on the broadcast network is equal to the product of the size of the content in megabites and the cost of transport per megabite on the broadcast network (bcEC=S*bcC).

At step 312, content decision server 120*b* determines whether the available bandwidth on the broadcast network (bcBW) is less than the minimum transfer rate for the content (R). If the available bandwidth on the broadcast network (bcBW) is less than the minimum transfer rate for the content (R), which indicates that there is not enough available bandwidth on the broadcast network, then at step 314 content decision server 120*b* determines that content will be transmitted over the broadband network. If the available bandwidth on the broadcast network (bcBW) is not less than the minimum transfer rate for the content (R), then at step 316 content decision server determines whether the estimated cost of transport on the broadband network (bbEC) is less than the estimated cost of transport on the broadcast network (bcEC). If the estimated cost of transport on the broadband network (bbEC) is less than the estimated cost of transport on the broadcast network (bcEC), then at step 314 content decision server 120*b* determines that content will be transmitted over a broadband network. If the estimated cost of transport on the broadband network (bbEC) is not less than the estimated cost of transport on the broadcast network (bcEC), then at step 318 content decision server 120*b* determines that content will be transmitted over a broadcast network.

The process described above in connection with FIG. 3 is for illustrative purposes and may be expanded to incorporate other variables such as, for example, the time (T) that content is desired to be viewed. If the viewer does not require the content to be viewed immediately, then the transmission of the content may be scheduled for the time at which the cost of transmission is lowest. For example, the viewer may request delivery for the next day, which would enable delivery at night when transmission costs are likely to be low. Similarly, a "trickle stream", i.e. transmitting data at a slow speed over a long period of time, may also be employed to preserve available bandwidth on a given network.

Figure 4:
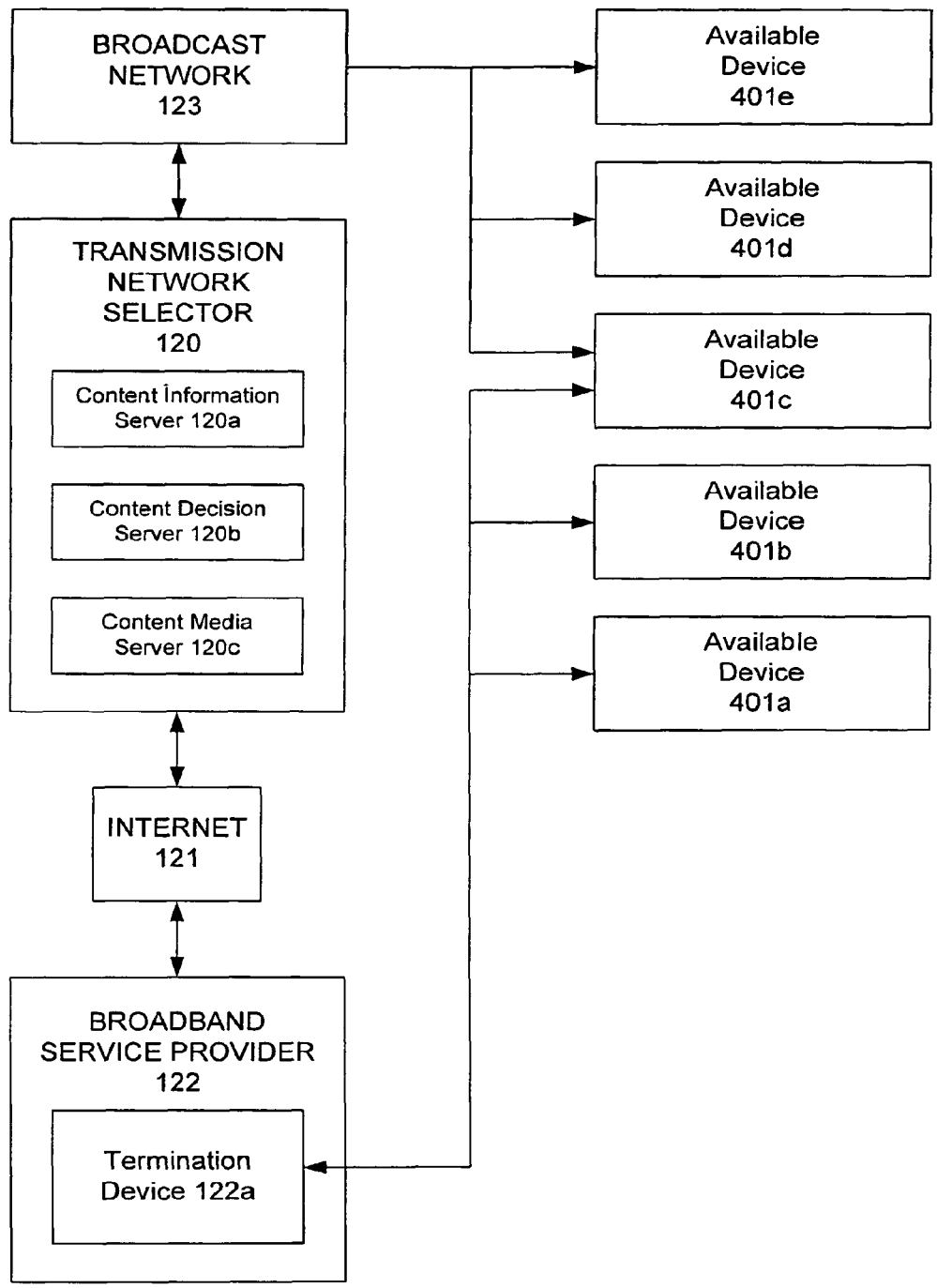
FIG. 4 is a block diagram of an alternative system for network transmission selection in accordance with an aspect of the invention.

Those skilled in the art will recognize that content information server 220*a*, content decision server 220*b*, content media server 220*c*, and viewer device 101 may comprise an appropriately programmed computing device. FIG. 4 is a block diagram of a generic computing system suitable for use in a system in accordance with the present invention. As shown, computing device 420 includes processing unit 422, system memory 424, and system bus 426 that couples various system components including system memory 424 to the processing unit 422. The system memory 424 might include read-only memory (ROM) and random access memory (RAM). The system might further include hard-drive 428, which provides storage for computer readable instructions, data structures, program modules and other data. A viewer may enter commands and information into the computer 420 through input devices such as a keyboard 440 and pointing device 442 which may be, for example, a mouse or remote control. A monitor 444 or other type of display device is also connected to the system for output. Communications device 443, which in one embodiment may be a modem, provides for communications over a network such as, for example, broadband network 131 and the Internet 121. Processor 422 can be programmed with instructions to interact with other computing systems so as to perform the algorithms described above with reference to FIGS. 2 and 3. The instructions may be received from networks 121 and 131 or stored in memory 424 and/or hard drive 428. Processor 422 may be loaded with any one of several computer operating systems such as Windows NT, Windows 2000, or Linux.

A block diagram of an alternative system for network transmission selection in accordance with an aspect of the invention is shown in FIG. 4. In the alternative system of FIG. 4, content may be transmitted to one or more available devices 401*a-e*. Available devices 401*a-e* may be any devices that are capable of content playback such as, for example, televisions, set top boxes, receivers, portable media players, and desktop or notebook personal computers. Available devices 401*a-e* may be stationary or portable devices. Available devices 401*a-e* may receive content over a cable and/or wired connection or a wireless connection. Available devices 401*a-e* may be located in user location 100 or may be located at any number of remote locations.

Available devices 401*a* and 401*b* are connected to only broadband network 122 and not broadcast network 123. Available devices 401*d* and 401*e* are connected to only broadcast network 123 and not broadband network 122. Available device 401*c* is connected to both broadband network 122 and broadcast network 123. As should be appreciated, despite the exemplary configuration of available devices 401*a-e* in FIG. 4, this system may include any number of available devices, and any number of these available devices may be connected to only broadband network 122, only broadcast network 123, both broadcast network 123 and broadcast network 123, and also any number of additional networks such as, for example, local area networks.

A list of available devices 401*a-e* associated with a particular user account may be stored in an account profile. The account profile may be stored at the requesting device or in any other device and/or memory that is accessible to the requesting device and/or transmission network selector 120. In addition to listing available devices 401*a-e*, the account profile may list one or more corresponding networks to which each available device is connected. The account profile may also include routing information for each of the available devices 401*a-e*.

A transmission request may be submitted from a requesting device to content decision server 120*b*. The transmission request may specify one or more of available devices 401*a-e* to be receiving devices to which the requested content is to be transmitted. The transmission request may also specify any number of other request characteristics such as those which have been described above. The requesting device may be any of available devices 401*a-c* that are connected to broadband network 122 or another device that is connected to broadband network 122. The requesting device need not necessarily be at the same location as any of the specified receiving devices.

Figure 5:
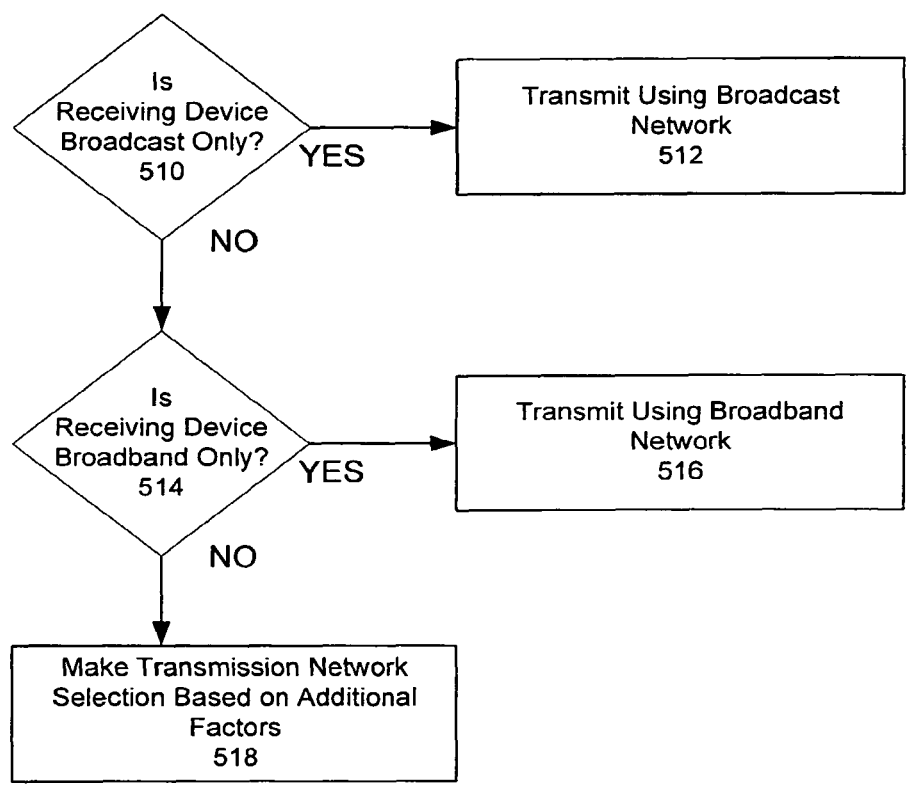
FIG. 5 is a flow chart of an alternative method for network transmission selection in accordance with the present invention.
Figure 6:
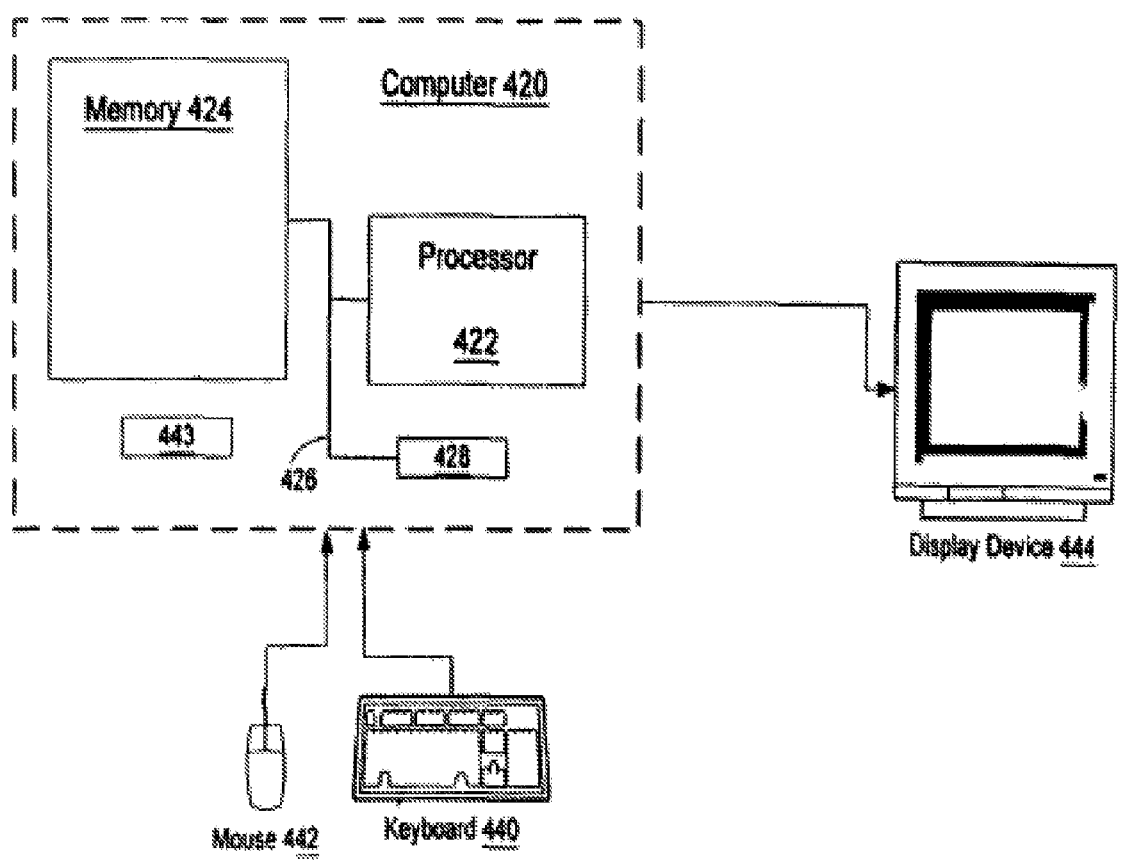
FIG. 6 is a block diagram of a computing device for use in a system in accordance with the invention.

Upon receiving the transmission request from the requesting device, content decision server 120*b* may determine over which network to transmit the requested content. This determination may be based, at least in part, on whether each receiving device is connected to only broadband network 122, only broadcast network 123, or both broadcast network 123 and broadcast network 123. An exemplary method for making this determination for each receiving device is depicted in FIG. 5. At step 510, it is determined whether the receiving device is broadcast only, meaning that it is connected to broadcast network 123 and not broadband network 122. If so, then, at step 512, the content is transmitted to the receiving device over broadcast network 123. If not, then, at step 514, it is determined whether the receiving device is broadband only, meaning that it is connected to broadband network 122 and not broadcast network 123. The determinations at steps 510 and 514 may be made by, for example, looking up the corresponding connected networks for the receiving device from the account profile. If the receiving device is broadband only, then, at step 516, the content is transmitted to the receiving device over broadband network 122. If not, then it may be concluded that the receiving device is connected to both broadcast network 123 and broadband network 122. In this case, at step 518, the transmission selection may be made based on additional factors. These additional factors may include the characteristics that were described above with reference to step 218 of FIG. 2 such as, for example, the characteristics of the transmission request, the characteristics of the content to be transmitted, the characteristics of the broadcast network, the characteristics of the broadband network, and the nature and volume of all other requests. At step 520, a transmission notification may be sent to the requesting device and/or the receiving device. The transmission notification may include, for example, an identification of the transmission network and/or the time of transmission.

Those skilled in the art understand that computer readable instructions for implementing the above described processes, such as those described with reference to FIGS. 2, 3 and 5, can be generated and stored on one of a plurality of computer readable media such as a magnetic disk or CD-ROM. Further, a computer such as that described with reference to FIG. 6 may be arranged with other similarly equipped computers in a network, and each computer may be loaded with computer readable instructions for performing the above described processes. Specifically, referring to FIG. 6, microprocessor 422 may be programmed to operate in accordance with the above-described processes.

While the invention has been described and illustrated with reference to specific embodiments, those skilled in the art will recognize that modification and variations may be made without departing from the principles of the invention as described above and set forth in the following claims. For example, while the invention has been described as being used to determine whether to transmit content over a DSL network or a DTH satellite network, the invention might also be used to determine whether to transmit content over any broadband network such as, for example, a cable system or any broadcast network such as, for example, a wireless network using modulated frequency signals. Furthermore, the list of available content items, the viewer's content transmission request, and the transmission notification may be transmitted between the transmission network selector and the viewer device using any broadband network. Accordingly, reference should be made to the appended claims as indicating the scope of the invention.

What is claimed is:

1. A method, comprising:
   receiving, by a system comprising a processor, a request for viewing video content at a media processor device;
   determining, by the system, whether the media processor device is communicatively coupled to both a broadband network and a broadcast network according to an account profile that is associated with the media processor device;
   identifying, by the system, playback command features available with the video content responsive to the media processor device being communicatively coupled to both the broadcast network and the broadband network;
   selecting, by the system, a transmit network as one of the broadcast network or the broadband network according to the playback command features; and
   transmitting, by the system, the video content to the media processor device according to the transmit network that is selected.

2. The method of claim 1, further comprising determining, by the system, a number of requests for the video content from a plurality of media processor devices, wherein the transmit network is further selected according to the number of requests that are determined.

3. The method of claim 1, wherein the transmit network is further selected according to playback command features of a second media processor device that is communicatively coupled to both the broadcast network and the broadband network.

4. The method of claim 1, wherein the transmit network is further selected according to whether the media processor device is communicatively coupled to the broadcast network or the broadband network responsive to the media processor device being communicatively coupled to the broadcast network or the broadband network but not both.

5. The method of claim 1, wherein the playback command features comprise one of a fast forward control, a rewind control, a pause control, a video recorder control, or any combination thereof.

6. The method of claim 1, further comprising formatting, by the system, the video content for transmission according to the transmit network that is selected.

7. The method of claim 6, wherein the video content is encapsulated in a spooler file and routed through a transport multiplexer for transmission via the broadcast network.

8. The method of claim 6, wherein the video content is encapsulated in a TCP/IP packet stream and routed through a switch fabric for transmission via the broadband network.

9. The method of claim 1, further comprising transmitting, by the system, a notification of transmission characteristics to the media processor device according to the transmit network that is selected.

10. The method of claim 9, wherein the transmission characteristics comprise one of: a time of transmission; transponder characteristics; stream characteristics; or any combination thereof.

11. The method of claim 9, wherein the media processor device performs monitoring for the video content according to the transmission characteristics.

12. The method of claim 1, wherein the request is not received from the media processor device.

13. The method of claim 1, further comprising estimating a cost of transport for one of the broadcast network, the broadband network, or any combination thereof, wherein the step of selecting, by the system, the transmit network is further performed according to the cost that is estimated.

14. A server, comprising:
a memory to store executable instructions; and
a processor coupled to the memory, wherein the executable instructions, when executed by the processor, facilitate performance of operations comprising:
transmitting a list of available content items to a media processor device;
receiving a selection of media content from the media processor device;
determining a playback command feature for the selection; determining whether the media processor device is communicatively coupled to both a broadband network and a broadcast network according to an account profile that is associated with the media processor device; and
selecting a transmit network as one of the broadband network or the broadcast network for delivery of the selection of media content according the playback command feature responsive to the media processor device being communicatively coupled to both the broadband network and the broadcast network; and
transmitting the selection of media content to the media processor device.

15. The server of claim 14, wherein the operations further comprise determining a number of requests for the selection of media content from a plurality of media processor devices, wherein the transmit network is further selected according to the number of requests.

16. The server of claim 14, wherein the playback command feature comprises one of a fast forward control, a rewind control, a pause control, a video recorder control, or any combination thereof.

17. The server of claim 14, wherein the transmit network is further selected according to whether the media processor device is communicatively coupled to one of the broadband network or the broadcast network but not both responsive to the media processor device being coupled to one of the broadcast network or the broadband network but not both.

18. A machine-readable storage device, comprising executable instructions which when executed by a processor at a media device to facilitate operations comprising:
transmitting a selection of media content to a media provider, wherein the media provider determines whether the media device is communicatively coupled to both a broadband network and a broadcast network, wherein the media provider selects a transmit network for delivery of the selection of media content according to a playback command feature that is available for the selection of media content responsive to the media device being communicatively coupled to both the broadband network and the broadcast network; and
receiving the selection from the media provider for presentation at a display device of the media device.

19. The machine-readable storage device of claim 18, wherein the media provider determines the playback command feature that is available for the selection of media content.

20. The machine-readable storage device of claim 18, wherein the playback command feature comprises one of a fast forward control, a rewind control, a pause control, a video recorder control, or any combination thereof.

* * * * *